United States Patent
Chang et al.

(10) Patent No.: US 10,738,899 B2
(45) Date of Patent: Aug. 11, 2020

(54) FAUCET

(71) Applicant: Globe Union Industrial Corp., Taichung (TW)

(72) Inventors: Yuanhao Chang, Taichung (TW); Chungyi Huang, Taichung (TW); Yiping Lin, Taichung (TW); Kuotung Ni, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 28 days.

(21) Appl. No.: 16/052,708

(22) Filed: Aug. 2, 2018

(65) Prior Publication Data

US 2020/0041012 A1 Feb. 6, 2020

(51) Int. Cl.
*E03C 1/04* (2006.01)
*F16K 11/078* (2006.01)
*E03C 1/02* (2006.01)

(52) U.S. Cl.
CPC ............ *F16K 11/078* (2013.01); *E03C 1/025* (2013.01); *E03C 2001/0415* (2013.01); *Y10T 137/9464* (2015.04)

(58) Field of Classification Search
None
See application file for complete search history.

(56) References Cited

U.S. PATENT DOCUMENTS

| | | | | |
|---|---|---|---|---|
| 2013/0199645 A1* | 8/2013 | Hsu | ..................... | F16K 19/006 137/801 |
| 2015/0259889 A1* | 9/2015 | Parikh | ..................... | E03C 1/04 137/607 |
| 2017/0016216 A1* | 1/2017 | Crowe | .................. | E03C 1/0401 |
| 2018/0155905 A1* | 6/2018 | Johnson | .................... | E03C 1/04 |
| 2018/0347158 A1* | 12/2018 | Bares | ........................ | E03C 1/04 |
| 2019/0186111 A1* | 6/2019 | Zeng | ........................ | E03C 1/04 |

* cited by examiner

*Primary Examiner* — John Fox
(74) *Attorney, Agent, or Firm* — Alan D. Kamrath; Karin L. Williams; Mayer & Williams PC

(57) ABSTRACT

A faucet contains: a hollow body, a control assembly, an inlet pipe set, a mixing-water outlet pipe, a pull hose, a spray head, and an isolation pipe. The hollow body includes an inflow portion and an outflow portion. The control assembly includes a mixing valve and an operation element. The inlet pipe set includes a cold-water inlet pipe and a hot-water inlet pipe. The mixing-water outlet pipe includes a first connector and a second connector. The pull hose includes an inlet segment and an outlet segment. The spray head is connected with the outlet segment of the pull hose, and the spray head is removed from and fixed on the outflow portion of the hollow body. The isolation pipe includes a channel defined therein so that the pull hose slidably moves in the isolation pipe and avoids contacting with the inlet pipe set and the mixing-water outlet pipe.

9 Claims, 18 Drawing Sheets

FAUCET

FIELD OF THE INVENTION

The present invention relates to faucets, and more particularly to a pull-out faucet and a pull-down faucet.

BACKGROUND OF THE INVENTION

A conventional pull-out or pull-down faucet contains a hollow body, a control assembly arranged on a basin (in a kitchen), and an inlet pipe set including a cold-water inlet pipe and a hot-water inlet pipe and connected with the control assembly so as to supply mixing water of cold water and hot water to a mixing valve set of the control assembly.

A mixing ration of the mixing water is controlled by using a control element of the control assembly. A mixing-water outlet pipe is coupled with the control assembly so as to guide the mixing water. A pull hose is connected with the mixing-water outlet pipe so as to supply the mixing water to a spray head from the hollow body, wherein the spray head is fixed on an outflow portion of the hollow body so as to pull the spray head to any position of a water tank. A counterweight assembly is secured on the pull hose under the basin, when the spray head is retracted or pulled, it moves back to an original position by using the counterweight assembly.

The basin has a housing aperture through which a threaded pipe is inserted so as to screw with a bottom of the hollow body, and a screw element is screwed with the threaded pipe and is abuts against a bottom fence of the basin, thus locking the hollow body on the basin.

When the pull hose contacts with the inlet pipe set and the mixing-water outlet pipe and the spray head is pulled, the pull hose is pulled forcefully. When the spray head is removed, it cannot move back to the original position quickly. To overcome such a problem, a size or a weight of the counterweight assembly is increased.

The present invention has arisen to mitigate and/or obviate the afore-described disadvantages.

SUMMARY OF THE INVENTION

One aspect of the present invention is to provide a pull-out faucet and a pull-down faucet which contain a spray head pulled and retracted smoothly.

Further aspect of the present invention is to provide a pull-out faucet and a pull-down faucet which contain a hollow body fixed securely by using an isolation pipe and a connection set.

Another aspect of the present invention is to provide a pull-out faucet and a pull-down faucet which contain a counterweight assembly configured to lock and unlock the connection set easily.

To obtain the above aspects, a faucet provided by the present invention contains: a hollow body, a control assembly, an inlet pipe set, a mixing-water outlet pipe, a pull hose, a spray head, and an isolation pipe.

The hollow body is mounted on a basin and includes an inflow portion formed on a bottom of the hollow body, and the hollow body also includes an outflow portion formed on a top of the hollow body.

The control assembly is fixed on the hollow body, and the control assembly includes a mixing valve and an operation element configured to control the mixing valve.

The inlet pipe set includes a cold-water inlet pipe and a hot-water inlet pipe which extend from the inflow portion of the hollow body to connect with the mixing valve of the control assembly so as to supply cold water and hot water toward the mixing valve respectively, thus producing mixing water of the cold water and the hot water in the mixing valve.

The mixing-water outlet pipe includes a first connector and a second connector, the first connector extending into the inflow portion of the hollow body to connect with the mixing valve, thus guiding the mixing water out of the mixing-water outlet pipe.

The pull hose includes an inlet segment and an outlet segment, the inlet segment connecting with the second connector of the mixing-water outlet pipe, and the outlet segment enters into the inflow portion of the hollow body and extending out of the outflow portion.

The spray head is in connection with the outlet segment of the pull hose, and the spray head is removed from and fixed on the outflow portion of the hollow body.

The isolation pipe, a part of which is coupled in the hollow body, and the other part of the isolation pipe extending out of a bottom of the basin from the inflow portion of the hollow body; wherein the isolation pipe includes a channel defined therein so that the pull hose slidably moves in the isolation pipe and avoids contacting with the inlet pipe set and the mixing-water outlet pipe.

Preferably, the hollow body includes a base and a bent pipe connected on a top of the base; the base has a hollow cavity defined therein, the bent pipe has a conduit formed therein and communicating with the hollow cavity, and the base has the inflow portion formed on a bottom thereof, wherein the bent pipe has the outflow portion arranged on a distal end thereof so that the pull hose extends to the outflow portion from the inflow portion along the hollow cavity and the conduit; the base further has an accommodation portion, and the accommodation portion has a receiving room defined therein and communicating with the hollow cavity so as to accommodate the mixing valve of the control assembly.

Preferably, a top of the isolation pipe is connected on a top of the hollow cavity of the base.

Preferably, the mixing valve of the control assembly further has a flowing seat fixed into the receiving room from the hollow cavity, and a valve core secured on the flowing seat and controlled by the operation element; the flowing seat accommodates the inlet pipe set and the mixing-water outlet pipe, a part of the flowing seat is located inside the hollow cavity, and the flowing seat abuts against an arcuate outer wall of the isolation pipe so as to limit a movement of the flowing seat to the hollow cavity.

Preferably, the flowing seat has a first orifice configured to connect with the cold-water inlet pipe, a second orifice configured to connect with the hot-water inlet pipe, and a third orifice configured to connect with the mixing-water outlet pipe; the flowing seat further has a limitation groove horizontally communicating with the first orifice, the second orifice, and the third orifice, wherein the limitation groove has a first hole and two second holes; the cold-water inlet pipe has a first recess defined relative to the flowing seat, the hot-water inlet pipe has a second recess formed relative to the flowing seat, and the mixing-water inlet pipe has a third recess formed relative to the flowing seat; a retainer has two feet extending outward therefrom so as to respectively insert into the two second holes from the first hole of the limitation groove of the flowing seat, a first arcuate indentation formed between the two feet so as to radially retain in the third recess of the mixing-water inlet pipe, thus fixing the mixing-water inlet pipe in the third orifice, and two second arcuate indentations arranged beside the two feet individually so as to retain into the first recess of the cold-water inlet pipe and the second recess of the hot-water inlet pipe respectively, thus fixing the cold-water inlet pipe and the hot-water inlet pipe in the first orifice and the second orifice; the retainer further has a third arcuate indentation configured to matingly contact with the arcuate outer wall of the isolation pipe.

Preferably, the faucet further contains a connection set which including a screw nut and at least one washer; the at least one washer is fitted on the isolation pipe, the screw nut has inner threads for screwing with outer threads of the isolation pipe so as to force the at least one washer on a bottom fence of the basin, and the hollow body is mounted on the basin.

Preferably, the faucet further contains a counterweight assembly, and the counterweight assembly including a tubular coupling sleeve and a hollow block; wherein the tubular coupling sleeve is fitted on the pull hose and has a disengagement segment and an engagement segment; the hollow block is fitted to the engagement segment from the disengagement segment of the tubular coupling sleeve so that the tubular coupling sleeve is pressed to deform inwardly so as to retain on the pull hose; the hollow block has a recess formed on at least one end thereof so as to matingly engage with the screw nut, thus rotating the screw nut tightly and loosely.

Preferably, the faucet further contains a sheath positioned on a bottom of the base, and the sheath including a first fixing aperture and a second fixing aperture communicating with the first fixing aperture, wherein the first fixing aperture is configured to accommodate the isolation pipe, and the second fixing aperture is configured to accommodate the inlet pipe set.

Preferably, the hollow body includes a first part and a second part accommodated in the first part; wherein the first part has a first cylindrical portion and an extension integrally extending from the first cylindrical portion, and the extension has a conduit defined therein; the second part has a hollow cavity formed therein, an outlet defined around the second part and communicating with the conduit, an accommodation portion formed on a top of the second part, a receiving room defined in the accommodation portion so as to accommodate the mixing valve of the control assembly, and the inflow portion formed on a bottom of the second part, wherein the extension of the first part has the outflow portion arranged on a distal end thereof so that the outlet segment of the pull hose extends out of the outlet and the conduit from the inflow portion along the hollow cavity.

Preferably, a top of the isolation pipe is connected with the bottom of the second part.

Preferably, the second part further has a holding portion formed on the bottom thereof, and a second cylindrical portion is connected between the receiving room and the holding portion, wherein the hollow cavity is located inside the second cylindrical portion, the outlet is defined on an outer wall of the second cylindrical portion, the holding portion has a trough and a first through aperture spaced from the trough, and the second cylindrical portion has an extending flap connected on an inner wall of the hollow cavity of the second cylindrical portion, wherein the extending flap separates a distance from a top of the holding portion so as to form a defining slot; the isolation pipe includes an annular nut fixed thereon, and the annular nut has an affix protrusion formed on a top thereof so that the annular nut partially retains in the defining slot, and the affix protrusion abuts against the extending flap so as to limit the annular nut, hence the isolation pipe is inserted through the basin and the through aperture to screw with the annular nut.

Preferably, the connection set includes a screw nut, a first washer, and a second washer; the first washer has a second through aperture corresponding to a housing aperture of the basin so that the inlet pipe set, the mixing-water outlet pipe, and the isolation pipe are inserted through the second through aperture; the second washer is formed in a disk shape, and the second washer has a recessed portion, a third through aperture passing through the recessed portion so that the isolation pipe is inserted through the third through aperture, a first forcing section arranged around the third through aperture so as to push the screw nut upward, a second forcing section formed in an arc shape and extending from a top of the recessed section so as to contact with a circular area of the first washer around the second through aperture; inner threads of the screw nut screw with the outer threads of the isolation pipe, and the second washer and the first washer contact with the housing aperture of the basin, thus fixing the second part on the basin.

Preferably, a diameter of the third through aperture of the second washer is more than the isolation pipe.

Preferably, a cutout is defined between the second forcing section and the first forcing section so that the inlet pipe set and the mixing-water outlet pipe are inserted through the cutout and the second through aperture respectively.

Accordingly, the pull hose is inserted through the channel of the isolation pipe to separate from the inlet pipe set and the mixing-water outlet pipe and to pull and retract the spray head smoothly.

The screw nut of the connection set are screwed with the isolation pipe so that the at least one washer or the first and second washers contact with the bottom fence of the housing aperture of the basin, and the hollow body is locked on the basin securely by ways of the isolation pipe.

The hollow block of the counterweight assembly is used as a rotation tool before connecting with the tubular coupling sleeve, for example, the recess matingly retains with and rotates the screw nut, thus locking or unlocking the tubular coupling sleeve.

DETAILED DESCRIPTION OF THE PREFERRED EMBODIMENTS

Figure 1:
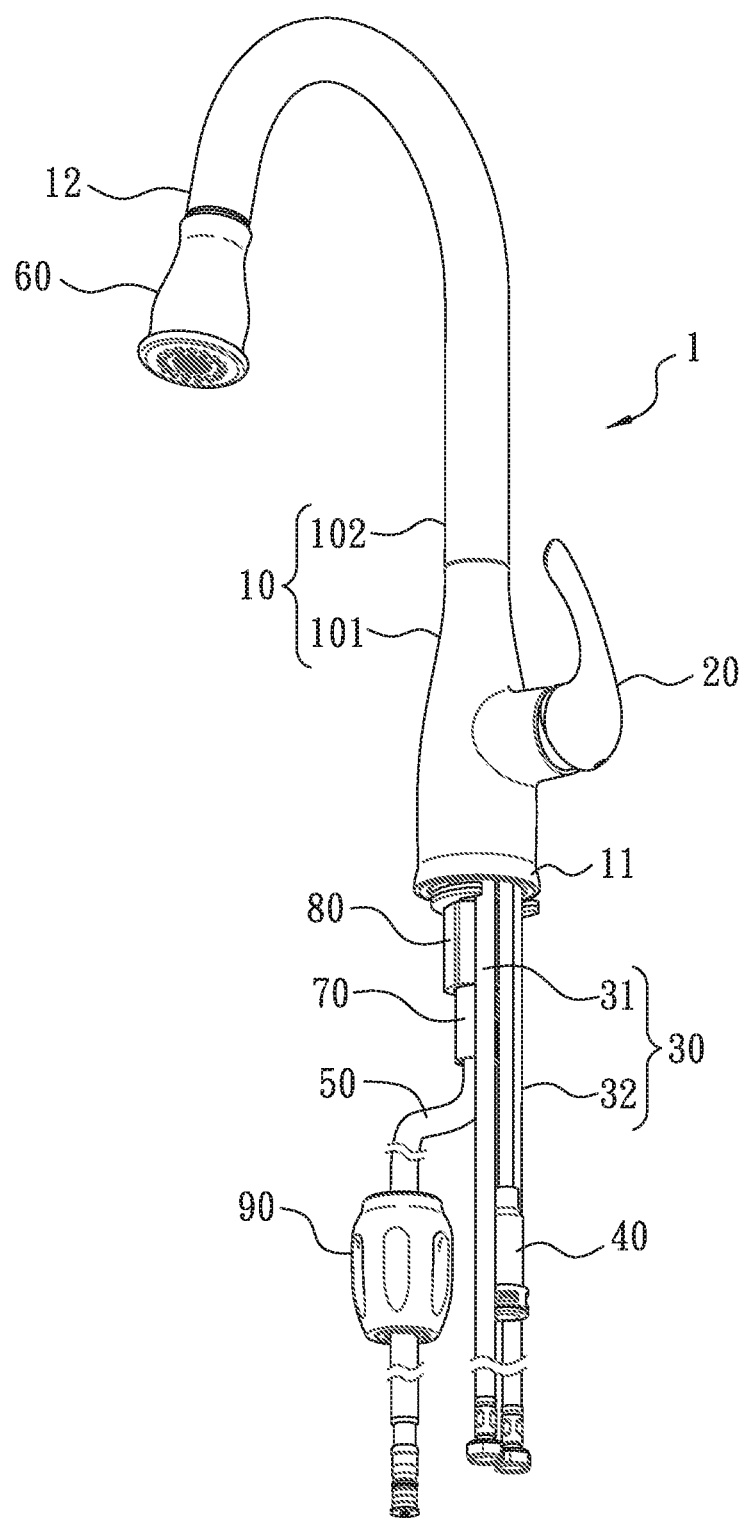
FIG. 1 is a perspective view showing the assembly of a faucet according to a first embodiment of the present invention.

With reference to FIGS. 1 to 4, a faucet according to a first embodiment of the present invention is a pull-out faucet 1 and comprises: a hollow body 10, a control assembly 20, an inlet pipe set 30, a mixing-water outlet pipe 40, a pull hose 50, a spray head 60, and an isolation pipe 70.

The hollow body 10 is mounted on a basin 2 and includes an inflow portion 11 formed on a bottom thereof, the hollow body 10 also includes an outflow portion 12 formed on a top of the hollow body 10.

The control assembly 20 is fixed on the hollow body 10, and the control assembly 20 includes a mixing valve 21 and an operation element 22 configured to control the mixing valve 21.

The inlet pipe set 30 includes a cold-water inlet pipe 31 and a hot-water inlet pipe 32 which extend from the inflow portion 11 of the hollow body 10 to connect with the mixing valve 21 of the control assembly 20 so as to supply cold water and hot water toward the mixing valve 21 respectively, thus producing mixing water of the cold water and the hot water in the mixing valve 21.

The mixing-water outlet pipe 40 includes a first connector 41 and a second connector 42, wherein the first connector 41 extends into the inflow portion 11 of the hollow body 10 to connect with the mixing valve 21, thus guiding the mixing water out of the mixing-water outlet pipe 40.

The pull hose 50 includes an inlet segment 51 and an outlet segment 52, wherein the inlet segment 51 connects with the second connector 42 of the mixing-water outlet pipe 40, and the outlet segment 52 enters into the inflow portion 11 of the hollow body 10 and extends out of the outflow portion 12.

Figure 2:
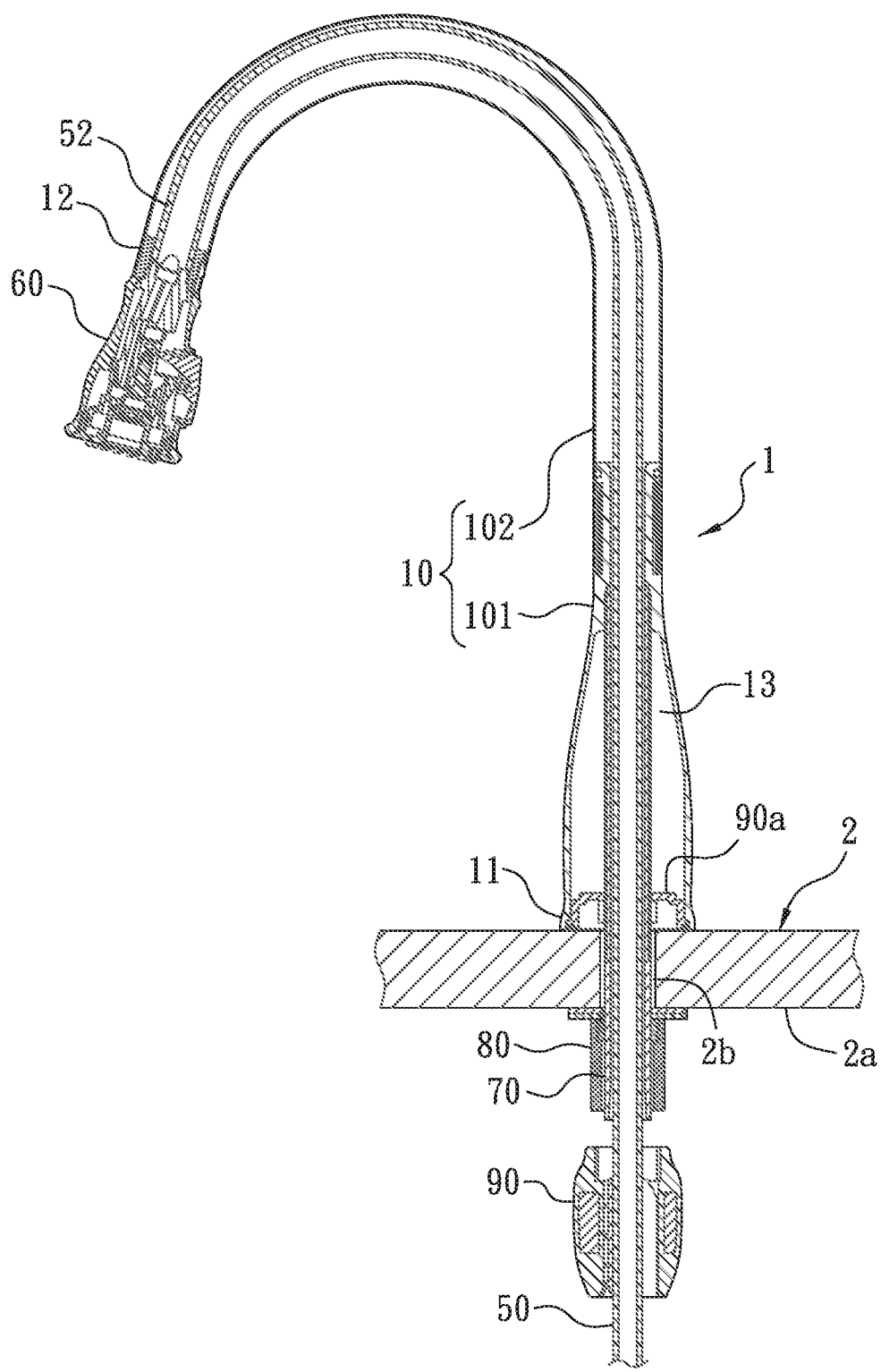
FIG. 2 is a cross sectional view showing the application of a part of the faucet according to the first embodiment of the present invention.

The spray head 60 is in connection with the outlet segment 52 of the pull hose 50, as shown in FIG. 2, and the spray head 60 is removed from and is fixed on the outflow portion 12 of the hollow body 10.

Figure 3:
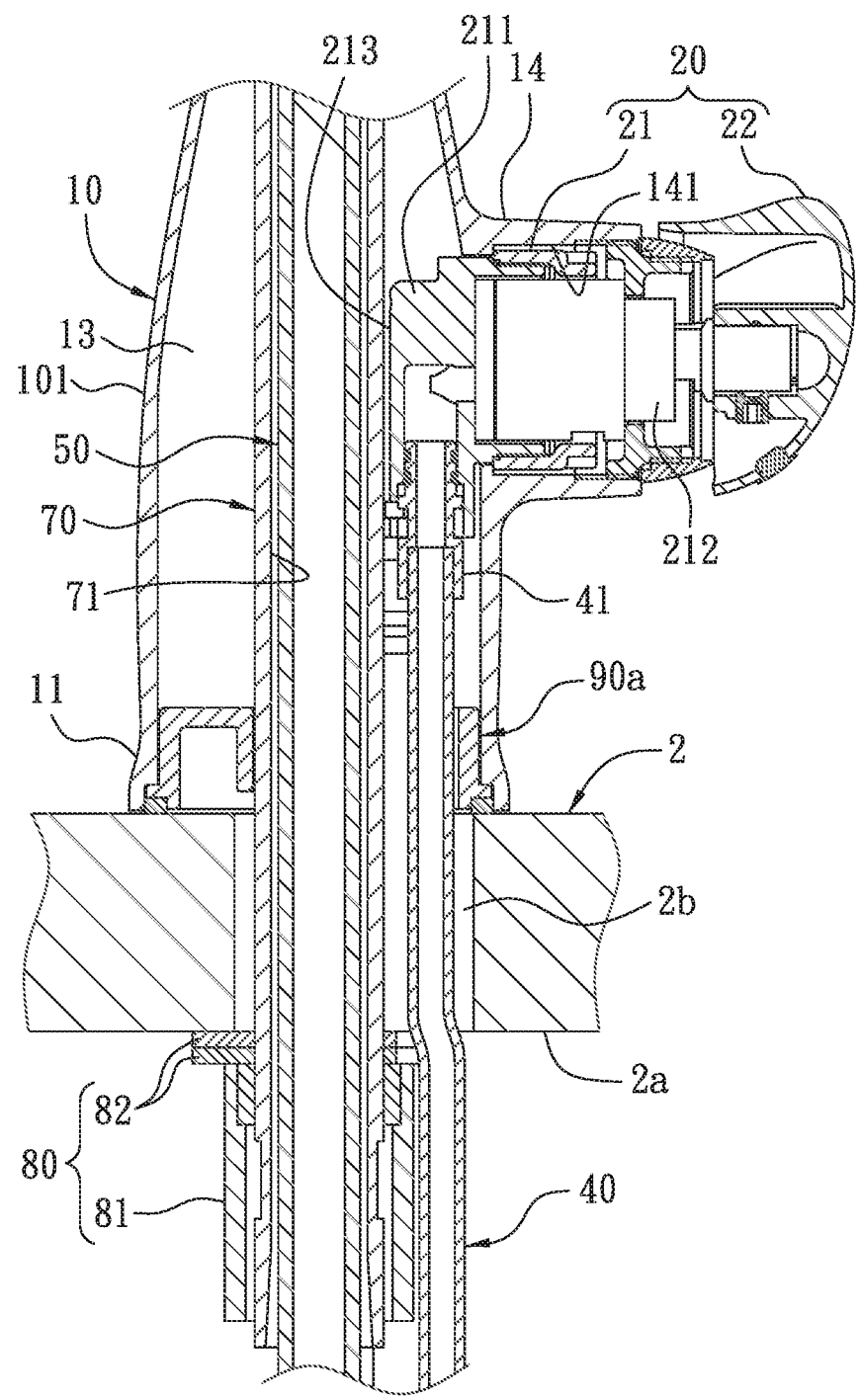
FIG. 3 is another cross sectional view showing the application of a part of the faucet according to the first embodiment of the present invention.

The isolation pipe 70, a part of which is coupled in the hollow body 10, and the other part of the isolation pipe 70 extends out of a bottom of the basin 2 from the inflow portion 11 of the hollow body 10. Referring to FIG. 3, the isolation pipe 70 includes a channel 71 defined therein so that the pull hose 50 slidably moves in the isolation pipe 70 and avoids contacting with the inlet pipe set 30 and the mixing-water outlet pipe 40. A diameter of the channel 71 is more than the pull hose 50 so that the pull hose 50 separates from the inlet pipe set 30 and the mixing-water outlet pipe 40 and is pulled smoothly.

As illustrated in FIG. 2, the hollow body 10 includes a base 101 and a bent pipe 102 connected on a top of the base 101; the base 101 has a hollow cavity 131 defined therein, the bent pipe 102 has a conduit 132 formed therein and communicating with the hollow cavity 131, and the base 101 has the inflow portion 11 formed on a bottom thereof, wherein the bent pipe 102 has the outflow portion 12 arranged on a distal end thereof so that the pull hose 50 extends to the outflow portion 12 from the inflow portion 11 along the hollow cavity 131 and the conduit 132. With reference to FIG. 3, the base 101 further has an accommodation portion 14, and the accommodation portion 14 has a receiving room 141 defined therein and communicating with the hollow cavity 131 so as to accommodate the mixing valve 21 of the control assembly 20. The belt pipe 102 is rotated on the base 101.

A top of the isolation pipe 70 is connected on a top of the hollow cavity 131 of the base 101 in a screwing manner, as shown in FIG. 2.

Figure 4:
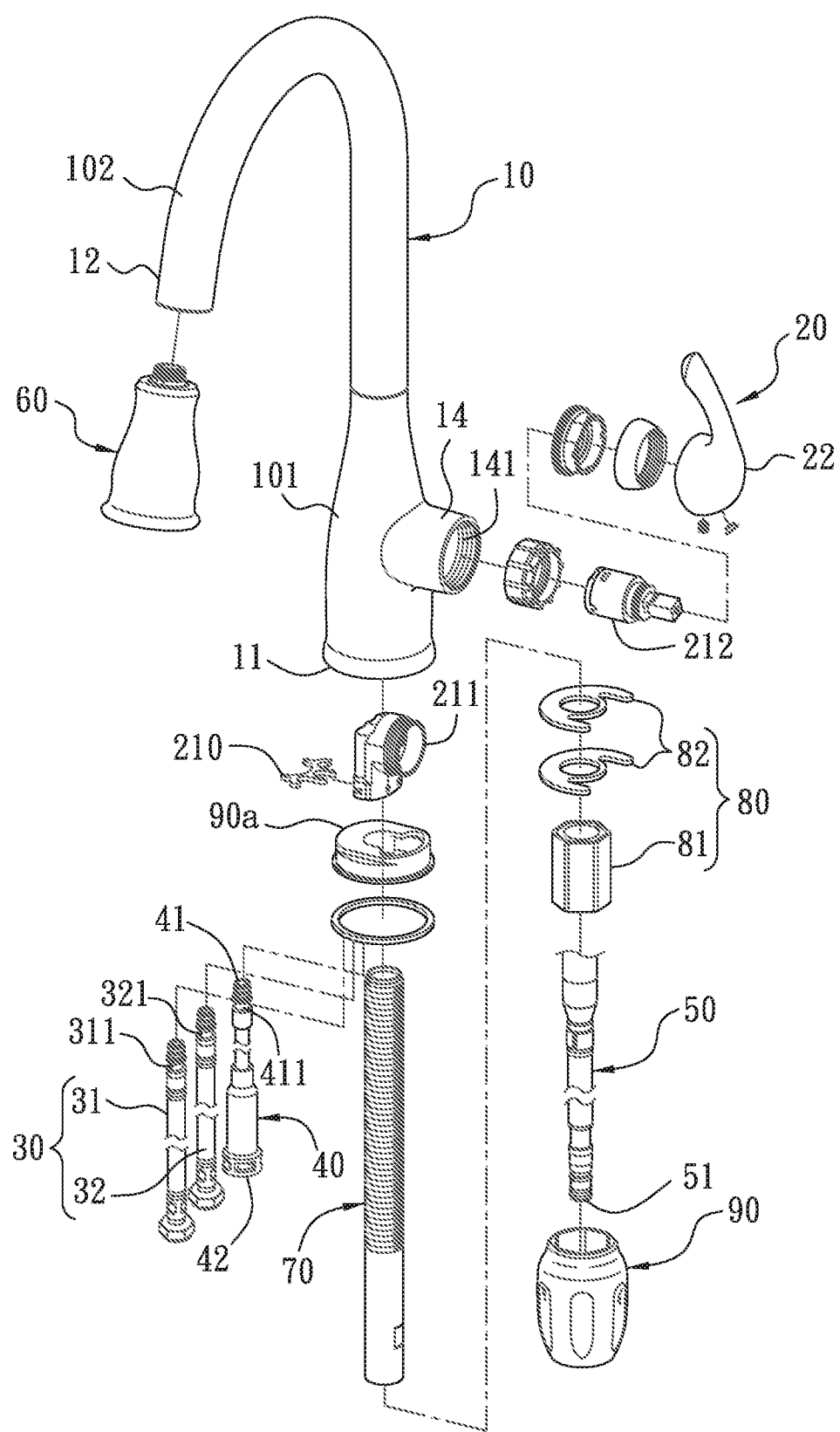
FIG. 4 is a perspective view showing the exploded components of a part of the faucet according to the first embodiment of the present invention.

Referring to FIGS. 3-4, the mixing valve 21 of the control assembly 20 further has a flowing seat 211 fixed into the receiving room 141 from the hollow cavity 131, and a valve core 212 secured on the flowing seat 211 and controlled by the operation element 22. The flowing seat 211 accommodates the inlet pipe set 30 and the mixing-water outlet pipe 40, a part of the flowing seat 211 is located inside the hollow cavity 131, and the flowing seat 211 abuts against an arcuate outer wall of the isolation pipe 70 so as to limit a movement of the flowing seat 211 to the hollow cavity 131. The flowing seat 211 is housed in the receiving room 141 from an opening of the base 101 via the hollow cavity 131 so that the flowing seat 211 contacts with the hollow cavity 131 by ways of the isolation pipe 70.

Figure 5:
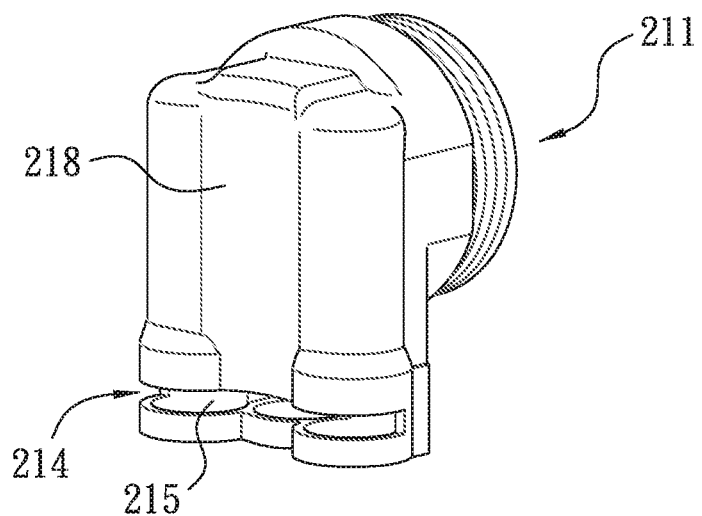
FIG. 5 is a perspective view showing the assembly of a part of the faucet according to the first embodiment of the present invention.

With reference to FIGS. 3 and 5, the flowing seat 211 has a concave positioning portion 213 formed thereon relative to the isolation pipe 70 so as to contact with the arcuate outer wall of the isolation pipe 70. In another embodiment, the flowing seat 211 has other positioning portions 213 of geometric shape.

Figure 6:
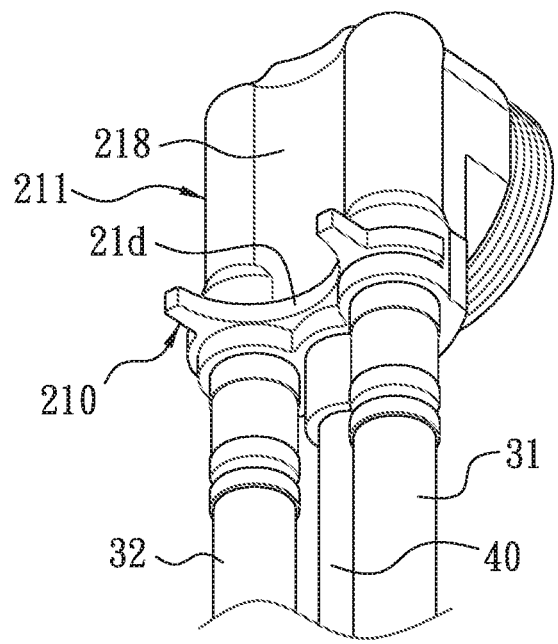
FIG. 6 is another perspective view showing the assembly of a part of the faucet according to the first embodiment of the present invention.
Figure 7:
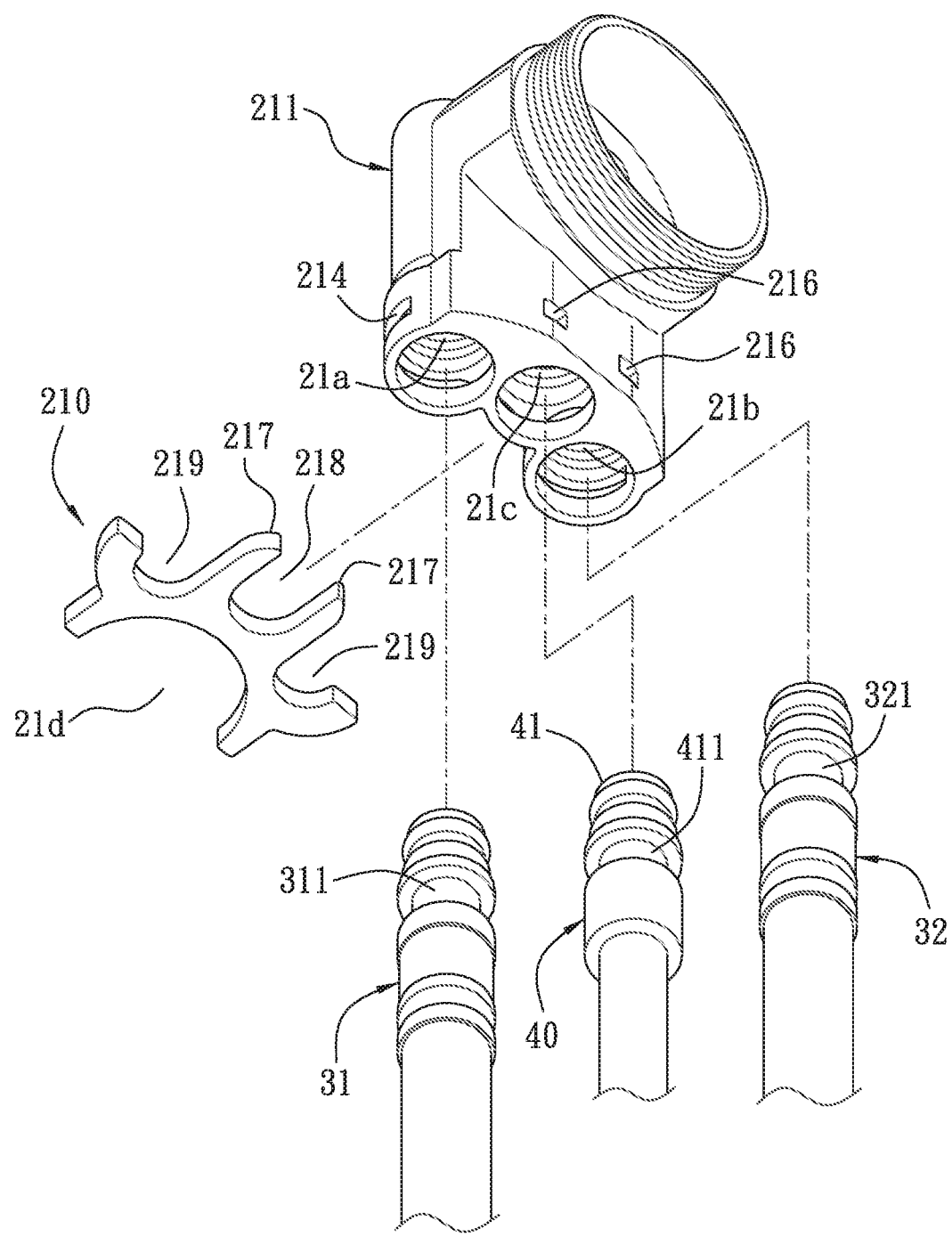
FIG. 7 is another perspective view showing the exploded components of a part of the faucet according to the first embodiment of the present invention.

Referring to FIGS. 5-7, the flowing seat 211 has a first orifice 21a configured to connect with the cold-water inlet pipe 31, a second orifice 21b configured to connect with the hot-water inlet pipe 32, and a third orifice 21c configured to connect with the mixing-water outlet pipe 40. The flowing seat 211 further has a limitation groove 214 horizontally communicating with the first orifice 21a, the second orifice 21b, and the third orifice 21c, wherein the limitation groove 214 has a first hole 215 and two second holes 216. The cold-water inlet pipe 31 has a first recess 311 defined relative to the flowing seat 211, the hot-water inlet pipe 32 has a second recess 321 formed relative to the flowing seat 211, and the mixing-water inlet pipe 40 has a third recess 411 formed relative to the flowing seat 211. A retainer 210 has two feet 217 extending outward therefrom so as to respectively insert into the two second holes 216 from the first hole 215 of the limitation groove 214 of the flowing seat 211, a first arcuate indentation 218 formed between the two feet 217 so as to radially retain in the third recess 411 of the mixing-water inlet pipe 40, thus fixing the mixing-water inlet pipe 40 in the third orifice 21c, and two second arcuate indentations 219 arranged beside the two feet 217 individually so as to retain into the first recess 311 of the cold-water inlet pipe 31 and the second recess 321 of the hot-water inlet pipe 32 respectively, thus fixing the cold-water inlet pipe 31 and the hot-water inlet pipe 32 in the first orifice 21a and the second orifice 21b. Accordingly, the retainer 210 fixes the cold-water pipe 31, the hot-water pipe 32, and the mixing-water pipe 40 on the flowing seat 211 quickly and securely. The retainer 210 further has a third arcuate indentation 21d formed opposite to the first arcuate indentation 218 and the two second arcuate indentations 219 and configured to matingly contact with the arcuate outer wall of the isolation pipe 70, wherein the retainer 210 is fixed in the limitation groove 214 by using the isolation pipe 70.

Figure 8:
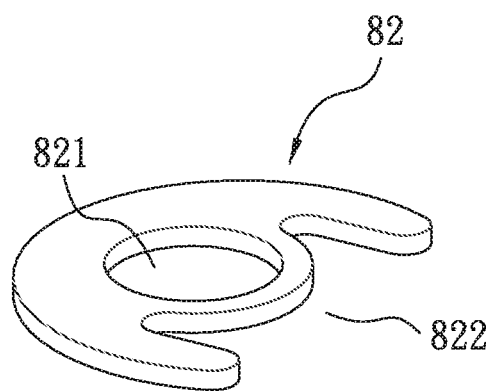
FIG. 8 is also another perspective view showing the assembly of a part of the faucet according to the first embodiment of the present invention.
Figure 9:
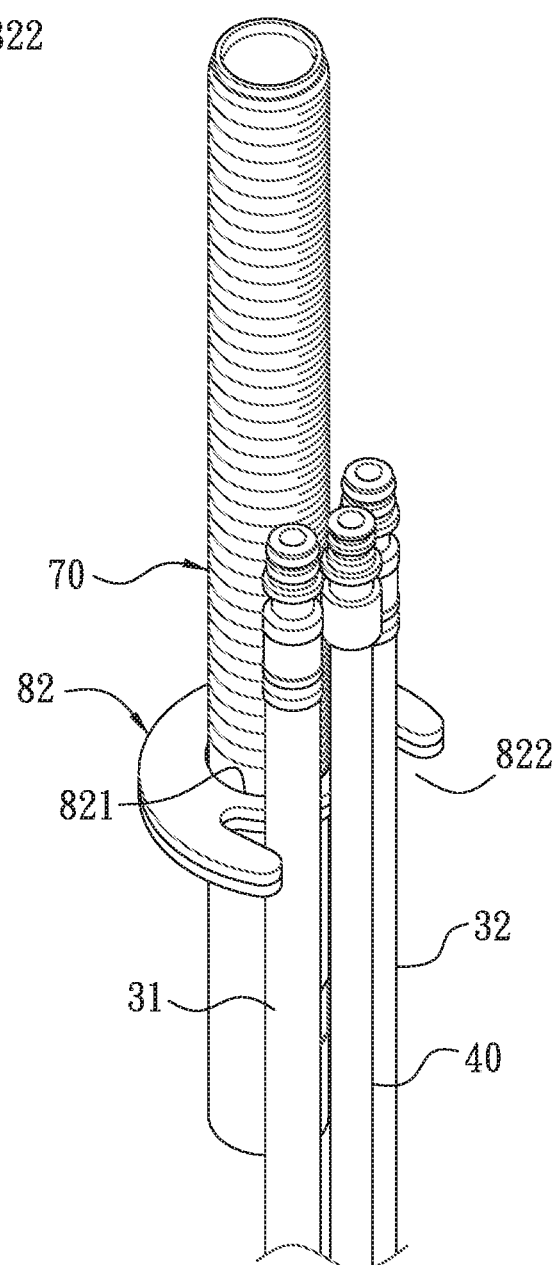
FIG. 9 is still another perspective view showing the assembly of a part of the faucet according to the first embodiment of the present invention.

As shown in FIGS. 4, 8 and 9, the pull-out faucet 1 further comprises a connection set 80 including a screw nut 81 and at least one washer 82. The at least one washer 82 is fitted on the isolation pipe 70, the screw nut 81 has inner threads for screwing with outer threads of the isolation pipe 70 so as to force the at least one washer 82 on a bottom fence 2a of the basin 2, and the hollow body 10 is mounted on the basin 2. The basin 2 includes a housing aperture 2b, wherein the at least one washer 82 contacts with the bottom fence 2a surrounded by the housing aperture 2b.

Each of the at least one washer 82 has a fitting aperture 821 and a notch 822, wherein the fitting aperture 821 is configured to accommodate the isolation pipe 70, and the notch 822 engages with the cold-water pipe 31 and the hot-water pipe 32, wherein each washer 82 is made of metal.

Figure 10:
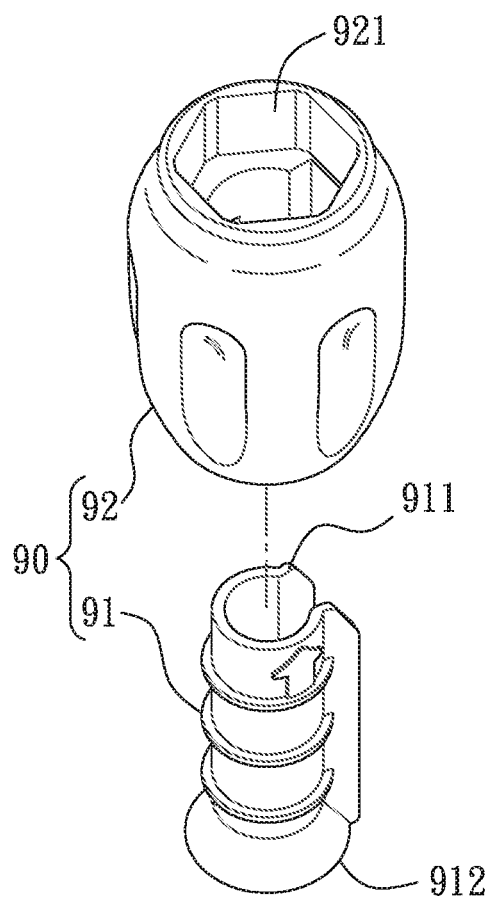
FIG. 10 is also another perspective view showing the exploded components of a part of the faucet according to the first embodiment of the present invention.
Figure 11:
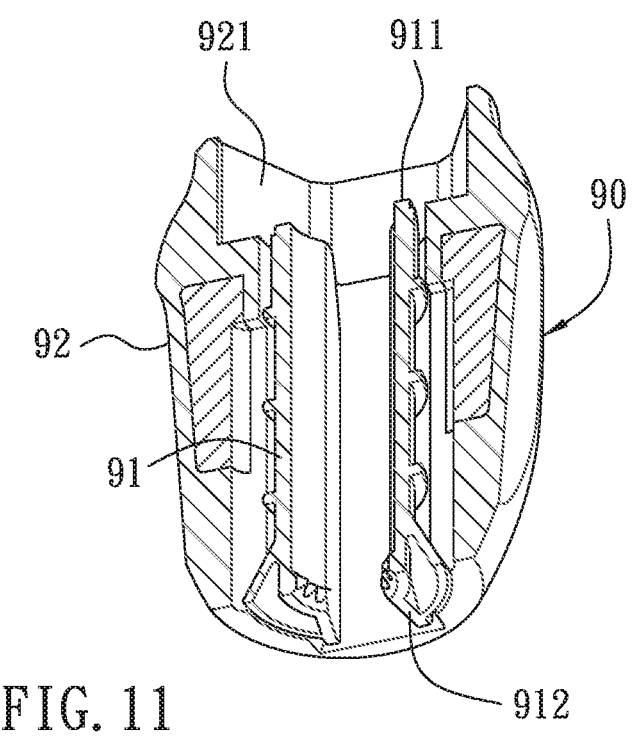
FIG. 11 is a cross-sectional perspective view showing the assembly of a part of the faucet according to the first embodiment of the present invention.

With reference to FIGS. 10 and 11, the pull-out faucet 1 further comprises a counterweight assembly 90, and the counterweight assembly 90 includes a tubular coupling sleeve 91 and a hollow block 92. The tubular coupling sleeve 91 is fitted on the pull hose 50 and has a disengagement segment 911 and an engagement segment 912. The hollow block 92 is fitted to the engagement segment 912 from the disengagement segment 911 of the tubular coupling sleeve 91 so that the tubular coupling sleeve 91 is pressed to deform inwardly so as to retain on the pull hose 50. The hollow block 92 has a recess 921 formed on at least one end thereof so as to matingly engage with the screw nut 81, wherein the recess 921 is polygonal so as to correspond to a polygonal wall of the screw nut 81.

Figure 12:
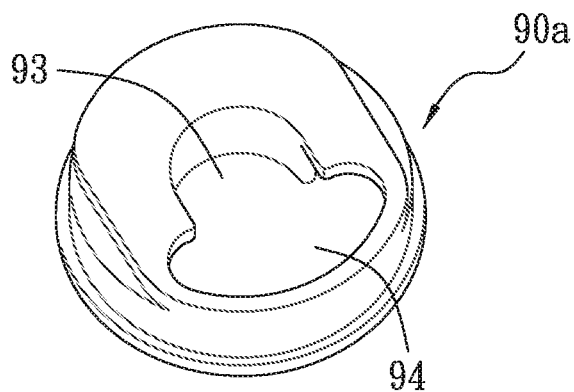
FIG. 12 is also another perspective view showing the assembly of a part of the faucet according to the first embodiment of the present invention.
Figure 13:
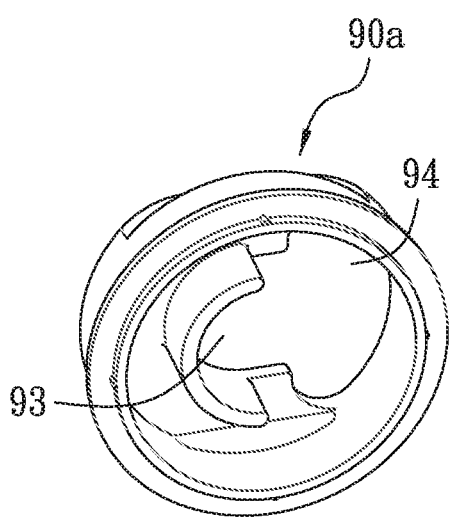
FIG. 13 is still another perspective view showing the assembly of a part of the faucet according to the first embodiment of the present invention.
Figure 14:
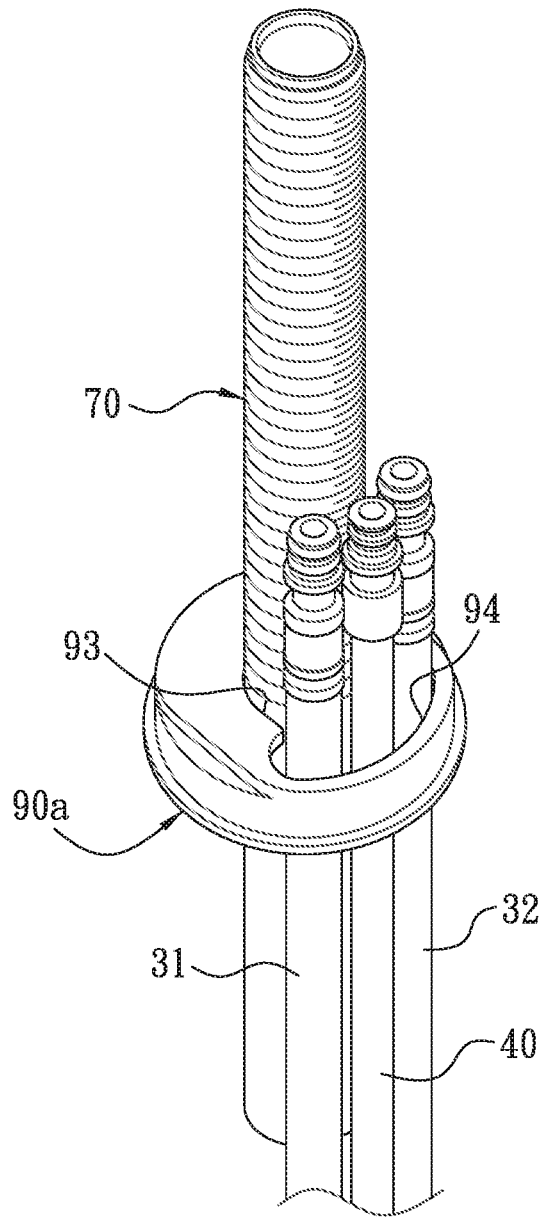
FIG. 14 is another perspective view showing the assembly of a part of the faucet according to the first embodiment of the present invention.

Referring to FIGS. 12-14, the pull-out faucet 1 further comprises a sheath 90a positioned on a bottom of the base 101, and the sheath 90a includes a first fixing aperture 93 and a second fixing aperture 94 communicating with the first fixing aperture 94. The first fixing aperture 93 is configured to accommodate the isolation pipe 70, and the second fixing aperture 94 is configured to accommodate the inlet pipe set 30.

Figure 15:
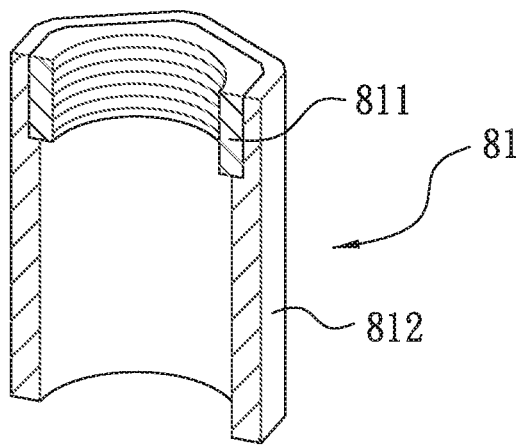
FIG. 15 is another cross-sectional perspective view showing the assembly of a part of the faucet according to the first embodiment of the present invention.
Figure 16:
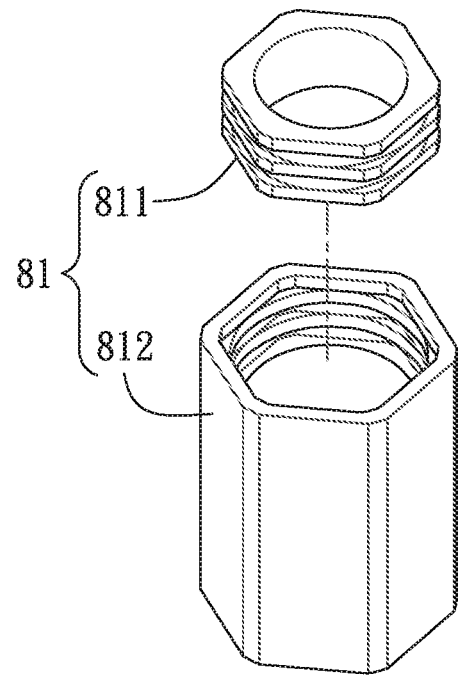
FIG. 16 is still another perspective view showing the exploded components of a part of the faucet according to the first embodiment of the present invention.

As shown in FIGS. 15 and 16, the screw nut 81 is comprised of a metal screwing part 811 and a plastic covering part 812 integrally covering the metal screwing part 811 and configured to form a main portion of the screw nut 81, wherein the metal screwing element is configured to form the inner threads of the screw nut 81, the metal screwing element 811 is arranged on an end of the plastic covering part 812, and a length of the metal screwing element 811 is less than the plastic covering part 812, for example, a length of the plastic covering element 812 is ¼ to ⅓ of the metal screwing element 811. When a thickness of the basin 2 is thin, the metal screwing element 811 faces downward, and the screw nut 81 screws with the isolation pipe 70 firmly. When the thickness of the basin 2 increases, the metal screwing element 811 faces upward, and the screw nut 81 screws with the isolation pipe 70 easily.

Figure 17:
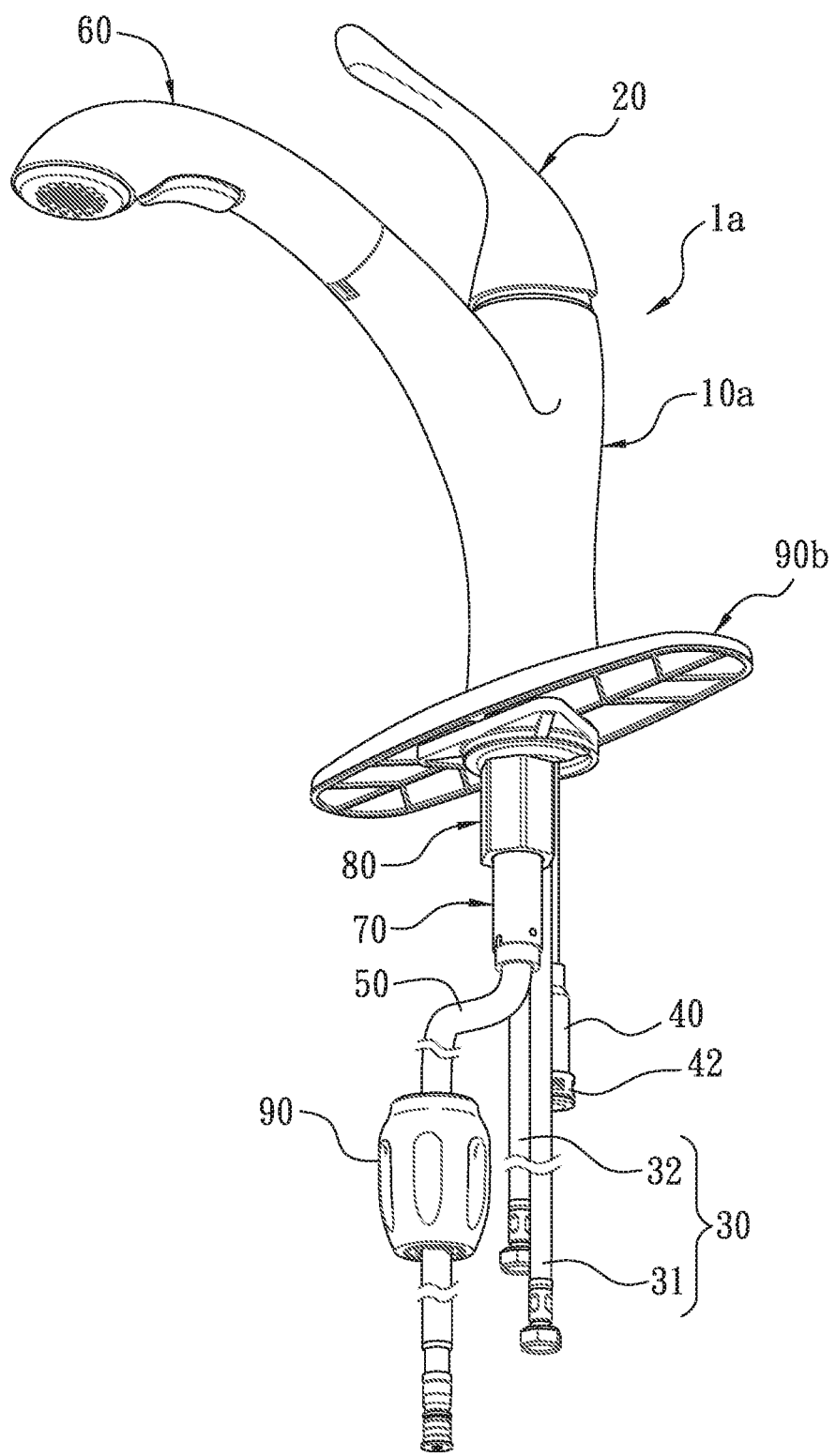
FIG. 17 is a perspective view showing the assembly of a faucet according to a second embodiment of the present invention.
Figure 18:
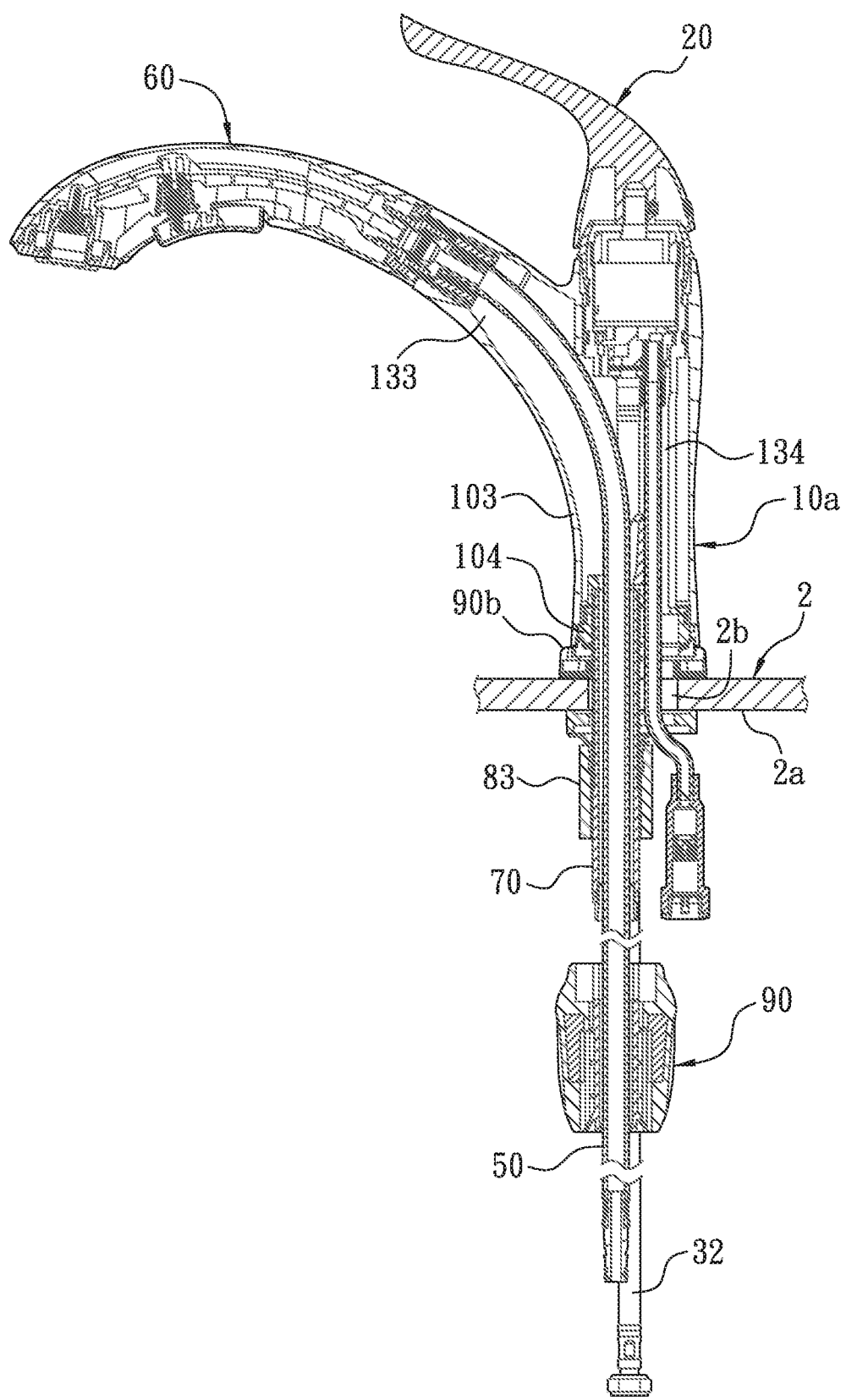
FIG. 18 is a cross sectional view showing the application of the faucet according to the second embodiment of the present invention.
Figure 19:
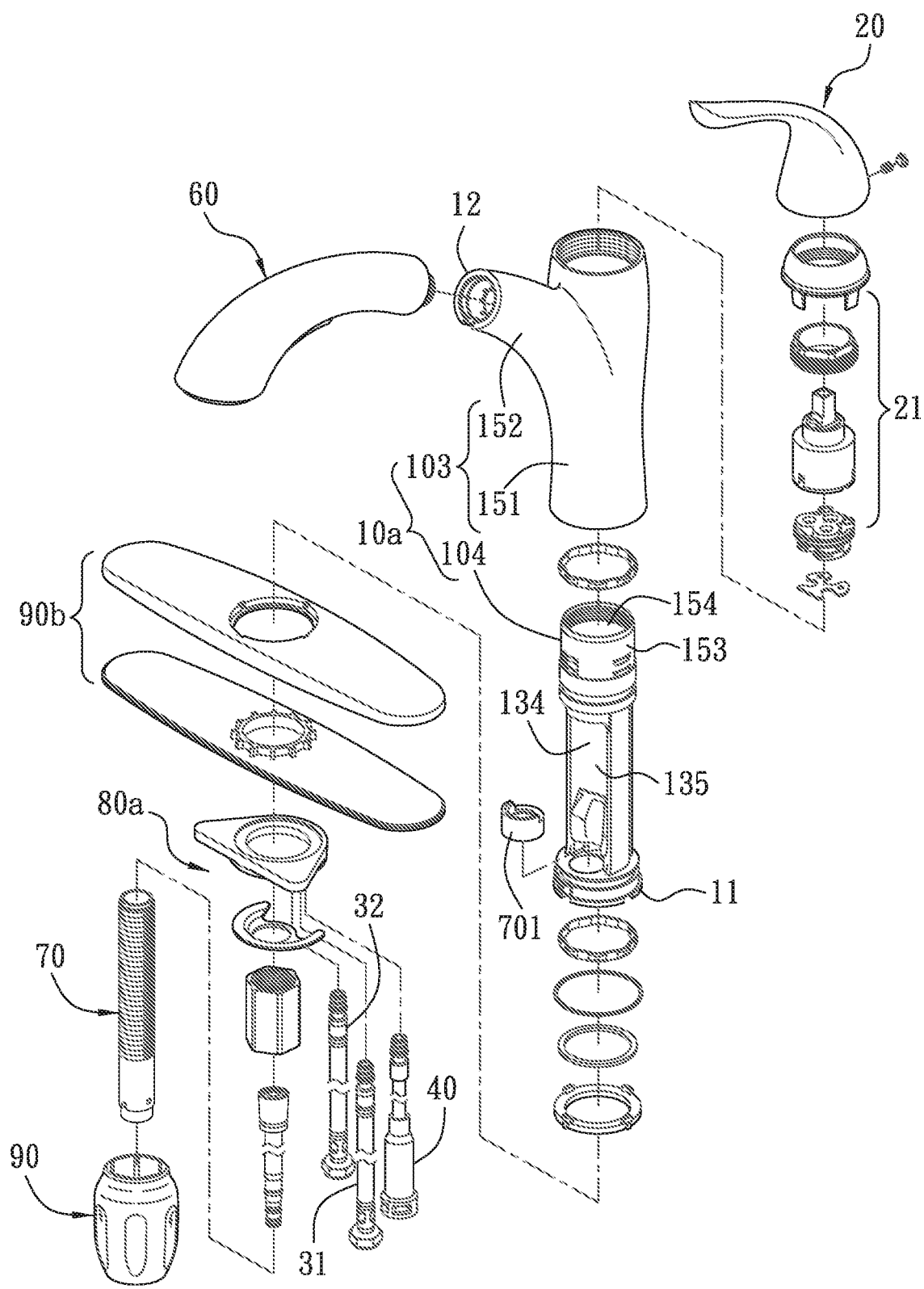
FIG. 19 is another cross sectional view showing the application of a part of the faucet according to the second embodiment of the present invention.

With reference to FIGS. 17-19, a difference of a pull-down faucet 1a of a second embodiment from the pull-out faucet 1 of the first embodiment comprises:

a hollow body 10a including a first part 103 and a second part 104 accommodated in the first part 103; wherein the first part 103 has a first cylindrical portion 151 and an extension 152 integrally extending from the first cylindrical portion 151, and the extension 152 has a conduit 133 defined therein; the second part 104 has a hollow cavity 134 formed therein, an outlet 135 defined around the second part 104 and communicating with the conduit 133, an accommodation portion 153 formed on a top of the second part 104, a receiving room 154 defined in the accommodation portion 153 so as to accommodate the mixing valve 21 of the control assembly 20, and the inflow portion 11 formed on a bottom of the second part 104. The extension 152 of the first part 103 has the outflow portion 12 arranged on a distal end thereof so that the outlet segment 52 of the pull hose 50 extends out of the outlet 135 and the conduit 133 from the inflow portion 11 along the hollow cavity 134 so as to stretch to the outflow portion 12.

Figure 20:
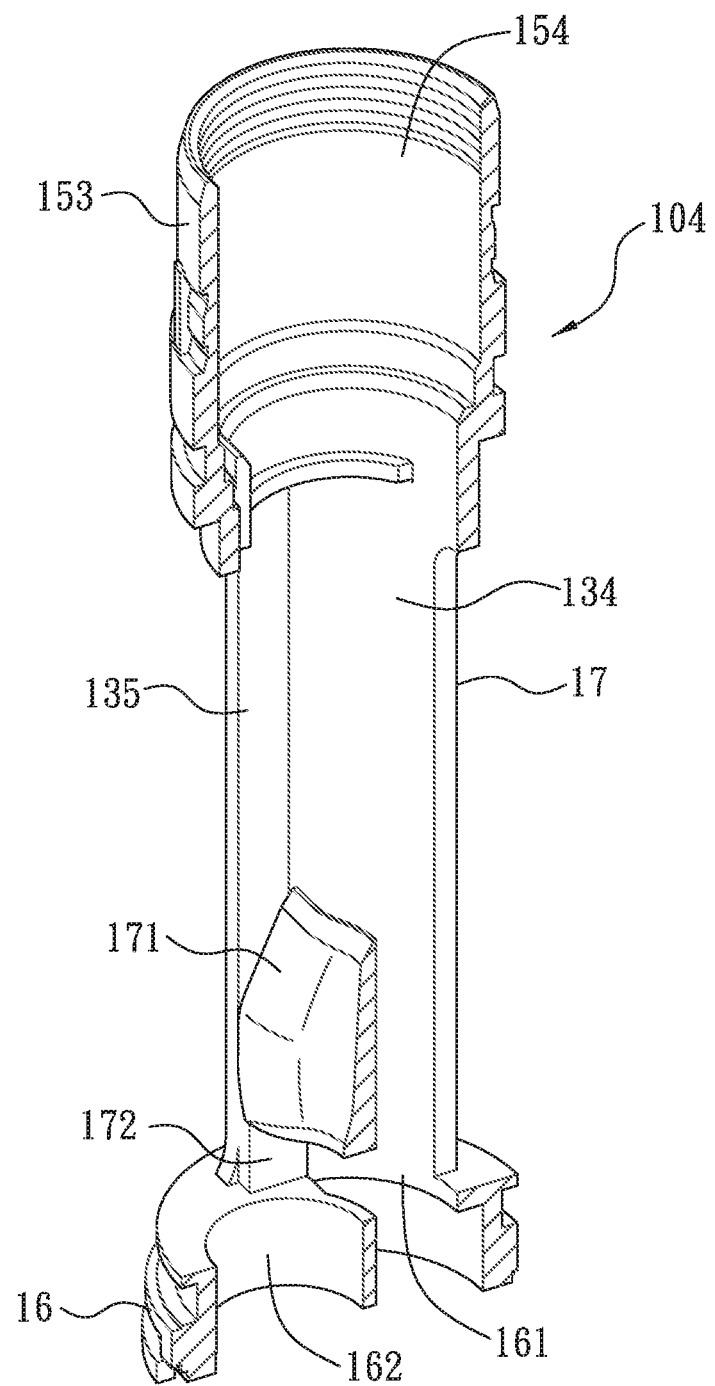
FIG. 20 is a cross-sectional perspective view showing the assembly of the faucet according to the second embodiment of the present invention.

A top of the isolation pipe 70 is connected with the bottom of the second part 104. Referring further to FIG. 20, the second part 104 further has a holding portion 16 formed on the bottom thereof, and a second cylindrical portion 17 is connected between the receiving room 154 and the holding portion 16, wherein the hollow cavity 134 is located inside the second cylindrical portion 17, the outlet 135 is defined on an outer wall of the second cylindrical portion 17, the holding portion 16 has a trough 161 and a first through aperture 162 spaced from the trough 161, and the second cylindrical portion 17 has an extending flap 171 connected on an inner wall of the hollow cavity 134 of the second cylindrical portion 17, wherein the extending flap 171 separates a distance from a top of the holding portion 16 so as to form a defining slot 172.

Figure 21:
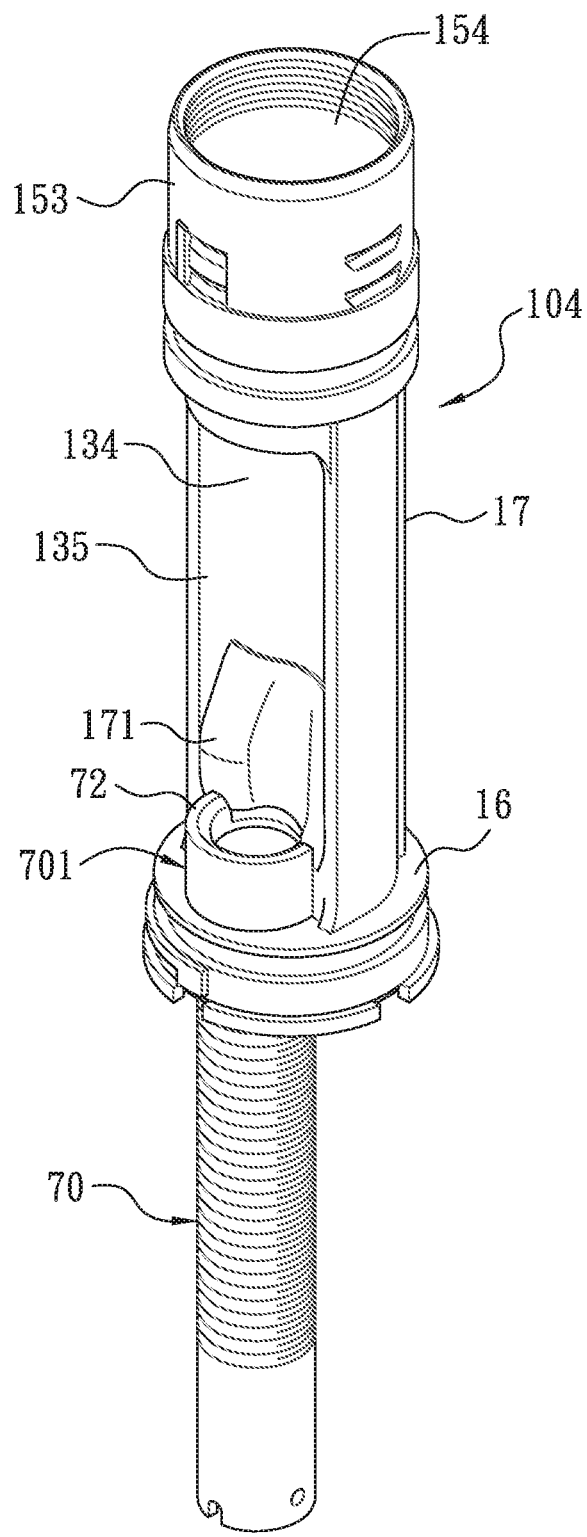
FIG. 21 is a perspective view showing the assembly of a part of the faucet according to the second embodiment of the present invention.
Figure 22:
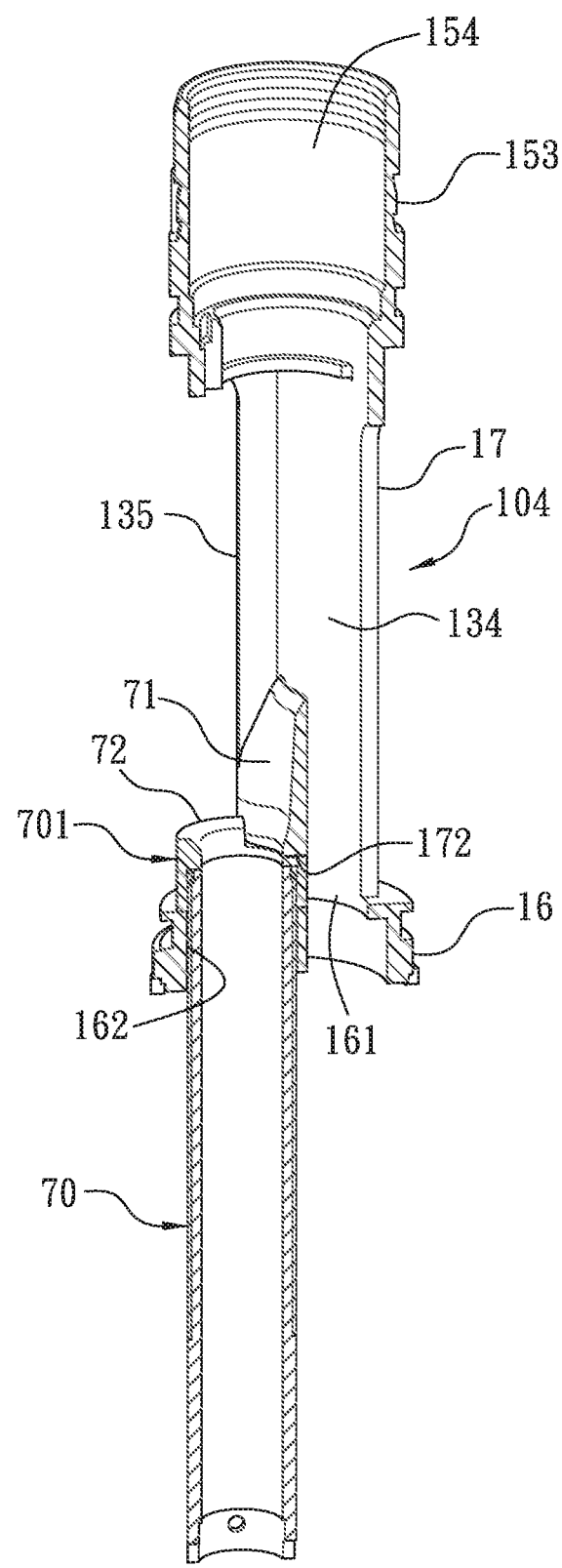
FIG. 22 is another cross-sectional perspective view showing the assembly of the faucet according to the second embodiment of the present invention.
Figure 23:
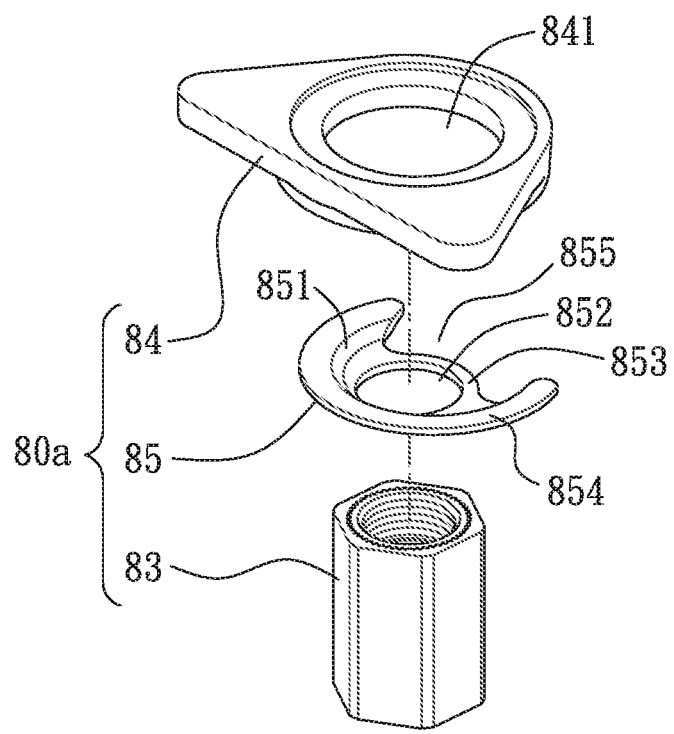
FIG. 23 is also another perspective view showing the assembly of a part of the faucet according to the second embodiment of the present invention.
Figure 24:
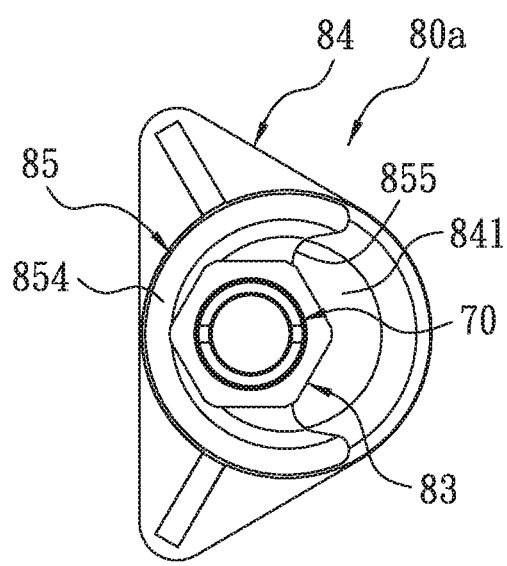
FIG. 24 is a side plan view showing the assembly of a part of the faucet according to the second embodiment of the present invention.
Figure 25:
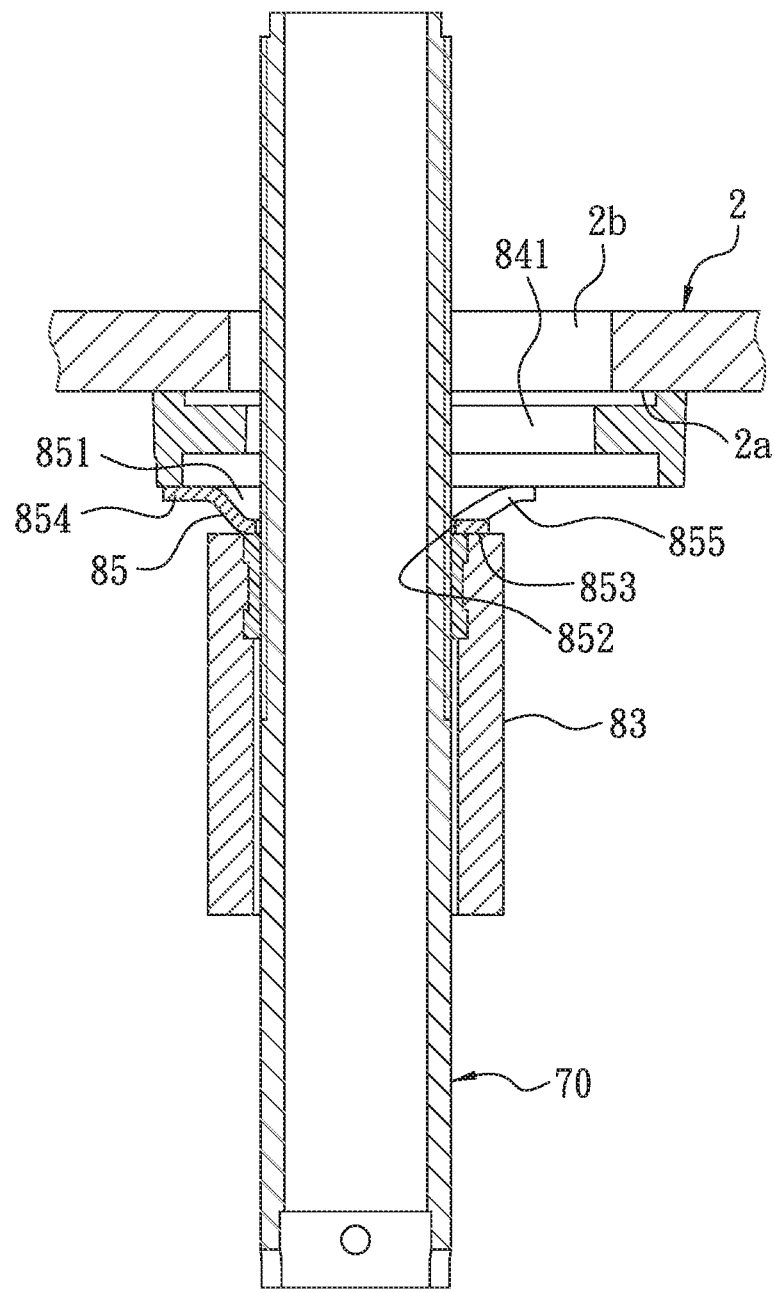
FIG. 25 is another cross sectional view showing the application of a part of the faucet according to the second embodiment of the present invention.

As shown in FIGS. 21 and 22, the isolation pipe 70 includes an annular nut 701 fixed thereon, and the annular nut 701 has an affix protrusion 72 formed on a top thereof so that the annular nut 701 partially retains in the defining slot 172, and the affix protrusion 72 abuts against the extending flap 171 so as to limit the annular nut 70, hence the isolation pipe 70 is inserted through the basin 2 and the through aperture 162 to screw with the annular nut 701.

As illustrated in FIGS. 17-19, a decoration assembly 90b is connected between a bottom of the hollow body 10a and the basin 2.

With reference to FIGS. 19 and 23-25, the connection set 80a includes a screw nut 83, a first washer 84, and a second washer 85. The first washer 84 is triangular and has a second through aperture 841 corresponding to the housing aperture 2b of the basin 2 so that the inlet pipe set 30, the mixing-water outlet pipe 40, and the isolation pipe 70 are inserted through the second through aperture 841. The second washer 85 is formed in a disk shape, and the second washer 85 has a recessed portion 851, a third through aperture 852 passing through the recessed portion 851 so that the isolation pipe 70 is inserted through the third through aperture 852, a first forcing section 853 arranged around the third through aperture 852 so as to push the screw nut 83 upward, a second forcing section 854 formed in an arc shape and extending from a top of the recessed section 851 so as to contact with a circular area of the first washer 84 around the second through aperture 841, such that inner threads of the screw nut 83 screw with the outer threads of the isolation pipe 70, and the second washer 83 and the first washer 84 contact with the housing aperture 2b of the basin 2, thus fixing the second part 104 on the basin 2.

A diameter of the third through aperture 852 of the second washer 85 is more than the isolation pipe 70 so that the third through aperture 852 accommodates the isolation pipe 70, and the inlet pipe set 30 and the mixing-water outlet pipe 40 pass outside the second washer 85. A cutout 855 is defined between the second forcing section 854 and the first forcing section 853 so that the inlet pipe set 30 and the mixing-water outlet pipe 40 are inserted through the cutout 855 and the second through aperture 841 respectively.

Accordingly, the pull hose 50 is inserted through the channel 71 of the isolation pipe 70 to separate from the inlet pipe set 30 and the mixing-water outlet pipe 40 and to pull and retract the spray head 60 smoothly.

The screw nut 81, 83 of the connection set 80, 80a are screwed with the isolation pipe 70 so that the at least one washer 82 or the first and second washers 84, 85 contacts with the bottom fence 2a of the housing aperture 2b of the basin 2m and the hollow body 10, 10a is locked on the basin 2 securely by ways of the isolation pipe 70.

The hollow block 92 of the counterweight assembly 90 is used as a rotation tool before connecting with the tubular coupling sleeve 91, for example, the recess 921 matingly retains with and rotates the screw nut 81, 83, thus locking or unlocking the tubular coupling sleeve 91.

While the preferred embodiments of the invention have been set forth for the purpose of disclosure, modifications of the disclosed embodiments of the invention as well as other embodiments thereof may occur to those skilled in the art. The scope of the claims should not be limited by the preferred embodiments set forth in the examples, but should be given the broadest interpretation consistent with the description as a whole.

What is claimed is:

1. A faucet comprising:
a hollow body mounted on a basin and including an inflow portion formed on a bottom of the hollow body, the hollow body also including an outflow portion formed on a top of the hollow body;
a control assembly fixed on the hollow body, and the control assembly including a mixing valve and an operation element configured to control the mixing valve;
an inlet pipe set including a cold-water inlet pipe and a hot-water inlet pipe which extend from the inflow portion of the hollow body to connect with the mixing valve of the control assembly so as to supply cold water and hot water toward the mixing valve respectively, thus producing mixing water of the cold water and the hot water in the mixing valve;
a mixing-water outlet pipe including a first connector and a second connector, the first connector extending into the inflow portion of the hollow body to connect with the mixing valve, thus guiding the mixing water out of the mixing-water outlet pipe;
a pull hose including an inlet segment and an outlet segment, the inlet segment connecting with the second connector of the mixing-water outlet pipe, and the outlet segment entering into the inflow portion of the hollow body and extending out of the outflow portion;
a spray head being in connection with the outlet segment of the pull hose, and the spray head being removed from and fixed on the outflow portion of the hollow body; and
an isolation pipe, a part of which is coupled in the hollow body, and the other part of the isolation pipe extending out of a bottom of the basin from the inflow portion of the hollow body; wherein the isolation pipe includes a channel defined therein so that the pull hose slidably moves in the isolation pipe and avoids contacting with the inlet pipe set and the mixing-water outlet pipe;
wherein the hollow body includes a base and a bent pipe connected on a top of the base; the base has a hollow cavity defined therein, the bent pipe has a conduit formed therein and communicating with the hollow cavity, and the base has the inflow portion formed on a bottom thereof, wherein the bent pipe has the outflow portion arranged on a distal end thereof so that the pull hose extends to the outflow portion from the inflow portion along the hollow cavity and the conduit; the base further has an accommodation portion, and the accommodation portion has a receiving room defined therein and communicating with the hollow cavity so as to accommodate the mixing valve of the control assembly;
wherein a top of the isolation pipe is connected on a top of the hollow cavity of the base.

2. The faucet as claimed in claim 1, wherein the mixing valve of the control assembly further has a flowing seat fixed into the receiving room from the hollow cavity, and a valve core secured on the flowing seat and controlled by the operation element; the flowing seat accommodates the inlet pipe set and the mixing-water outlet pipe, a part of the flowing seat is located inside the hollow cavity, and the flowing seat abuts against an arcuate outer wall of the isolation pipe so as to limit a movement of the flowing seat to the hollow cavity.

3. The faucet as claimed in claim 2, wherein the flowing seat has a concave positioning portion formed thereon relative to the isolation pipe so as to contact with the arcuate outer wall of the isolation pipe.

4. The faucet as claimed in claim 2, wherein the flowing seat has a first orifice configured to connect with the cold-water inlet pipe, a second orifice configured to connect with the hot-water inlet pipe, and a third orifice configured to connect with the mixing-water outlet pipe; the flowing seat further has a limitation groove horizontally communicating with the first orifice, the second orifice, and the third orifice, wherein the limitation groove has a first hole and two second holes; the cold-water inlet pipe has a first recess defined relative to the flowing seat, the hot-water inlet pipe has a second recess formed relative to the flowing seat, and the mixing-water inlet pipe has a third recess formed relative to the flowing seat; a retainer has two feet extending outward therefrom so as to respectively insert into the two second holes from the first hole of the limitation groove of the flowing seat, a first arcuate indentation formed between the two feet so as to radially retain in the third recess of the mixing-water inlet pipe, thus fixing the mixing-water inlet pipe in the third orifice, and two second arcuate indentations arranged beside the two feet individually so as to retain into the first recess of the cold-water inlet pipe and the second recess of the hot-water inlet pipe respectively, thus fixing the cold-water inlet pipe and the hot-water inlet pipe in the first orifice and the second orifice; the retainer further has a third arcuate indentation configured to matingly contact with the arcuate outer wall of the isolation pipe.

5. The faucet as claimed in claim 1 further comprising a connection set which including a screw nut and at least one washer; the at least one washer is fitted on the isolation pipe, the screw nut has inner threads for screwing with outer threads of the isolation pipe so as to force the at least one washer on a bottom fence of the basin, and the hollow body is mounted on the basin.

6. The faucet as claimed in claim 5, wherein each of the at least one washer has a fitting aperture and a notch, the fitting aperture is configured to accommodate the isolation pipe, and the notch engages with the cold-water pipe and the hot-water pipe.

7. The faucet as claimed in claim 5 further comprising a counterweight assembly, and the counterweight assembly including a tubular coupling sleeve and a hollow block; wherein the tubular coupling sleeve is fitted on the pull hose and has a disengagement segment and an engagement segment; the hollow block is fitted to the engagement segment from the disengagement segment of the tubular coupling sleeve so that the tubular coupling sleeve is pressed to deform inwardly so as to retain on the pull hose; the hollow block has a recess formed on at least one end thereof so as to matingly engage with the screw nut, thus rotating the screw nut tightly and loosely.

8. The faucet as claimed in claim 5, wherein the screw nut is comprised of a metal screwing part and a plastic covering part integrally covering the metal screwing part and configured to form a main portion of the screw nut, the metal screwing element is configured to form the inner threads of the screw nut, the metal screwing element is arranged on an end of the plastic covering part, and a length of the metal screwing element is less than the plastic covering part.

9. The faucet as claimed in claim 1 further comprising a sheath positioned on a bottom of the base, and the sheath including a first fixing aperture and a second fixing aperture communicating with the first fixing aperture, wherein the first fixing aperture is configured to accommodate the isolation pipe, and the second fixing aperture is configured to accommodate the inlet pipe set.

\* \* \* \* \*